(12) United States Patent
Williams

(10) Patent No.: US 8,716,999 B2
(45) Date of Patent: May 6, 2014

(54) DYNAMIC FREQUENCY AND PULSE-WIDTH MODULATION OF DUAL-MODE SWITCHING POWER CONTROLLERS IN PHOTOVOLTAIC ARRAYS

(75) Inventor: Bertrand J. Williams, Austin, TX (US)

(73) Assignee: Draker, Inc., Austin, TX (US)

( * ) Notice: Subject to any disclaimer, the term of this patent is extended or adjusted under 35 U.S.C. 154(b) by 38 days.

(21) Appl. No.: 13/359,593

(22) Filed: Jan. 27, 2012

(65) Prior Publication Data

US 2012/0206118 A1 Aug. 16, 2012

Related U.S. Application Data

(60) Provisional application No. 61/441,585, filed on Feb. 10, 2011.

(51) Int. Cl.
*H02M 3/157* (2006.01)
*H02M 1/36* (2007.01)

(52) U.S. Cl.
USPC .......................................... 323/283; 323/901

(58) Field of Classification Search
USPC .......... 323/259, 268, 282, 284, 285, 906, 283
See application file for complete search history.

(56) References Cited

U.S. PATENT DOCUMENTS

| | | | |
|---|---|---|---|
| 4,524,335 A | 6/1985 | Yokoyama | |
| 4,685,040 A | 8/1987 | Steigerwald et al. | |
| 4,733,104 A | 3/1988 | Steigerwald et al. | |
| 5,216,374 A | 6/1993 | George et al. | |
| 6,137,696 A | 10/2000 | Hall et al. | |
| 6,172,492 B1 | 1/2001 | Pletcher et al. | |
| 6,456,512 B1 | 9/2002 | Chen | |
| 6,504,423 B2 * | 1/2003 | Riggio et al. | 323/284 |
| 6,597,159 B2 | 7/2003 | Yang | |
| 6,608,521 B1 | 8/2003 | Baldwin et al. | |
| 6,995,592 B2 | 2/2006 | Agarwal | |
| 7,116,563 B2 | 10/2006 | Hua | |
| 7,126,397 B1 | 10/2006 | Mok | |
| 7,154,250 B2 | 12/2006 | Vinciarelli | |
| 7,177,166 B1 | 2/2007 | Kris | |

(Continued)

OTHER PUBLICATIONS

International Preliminary Report on Patentability for Application No. PCT/US2012/024488, mailed Sep. 27, 2013; 8 pages.

*Primary Examiner* — Gary L Laxton
*Assistant Examiner* — Alex Torres-Rivera
(74) *Attorney, Agent, or Firm* — Meyertons Hood Kivlin Kowert & Goetzel, P.C.; Jeffrey C. Hood

(57) ABSTRACT

A converter unit configured to couple to a photovoltaic panel may include a controller that monitors: an output voltage and output current obtained from the photovoltaic panel by a switching power core within the converter unit, and an output voltage and output current produced by the switching power core. The controller may calculate a desired duty-cycle value based on the monitored values, and implement a mapping algorithm that translates the duty-cycle value to a pulse-width value and a modulus value. The pulse-width value and the modulus value may be used to simultaneously respectively modulate the pulse-width and pulse-period of a pulse-width modulated (PWM) signal, while maintaining an appropriate linear final duty-cycle ratio between the pulse-width and the pulse-period of the PWM signal. The PWM signal may be provided to the switching power core to control the switching of the switching power core.

22 Claims, 9 Drawing Sheets

(56) References Cited

U.S. PATENT DOCUMENTS

| | | |
|---|---|---|
| 7,190,143 B2 | 3/2007 | Wei et al. |
| 7,212,417 B2 | 5/2007 | Fukumoto |
| 7,265,514 B1 | 9/2007 | Horng et al. |
| 7,667,552 B2 | 2/2010 | Midya et al. |
| 7,714,626 B2 | 5/2010 | Kris |
| 2007/0216458 A1* | 9/2007 | Chiu et al. .................... 327/175 |
| 2010/0289547 A1 | 11/2010 | Crofts |
| 2011/0006744 A1 | 1/2011 | Dearborn |
| 2011/0074302 A1* | 3/2011 | Draper et al. ................. 315/224 |
| 2011/0148374 A1* | 6/2011 | Gizara .......................... 323/282 |

* cited by examiner

```
temp_long        =     value + N;
temp_long       *=     N_K;
modulus_adj      =     (unsigned)(temp_long >> 7);

temp_long        =     value * N_K;
modulus_shp      =     (unsigned)(temp_long >> 5);    //
temp_long        =     N - value;
temp_long      >>=     5;                              //
temp_long       *=     modulus_shp;
temp_long      >>=     12;
modulus_shp      =     (unsigned)temp_long;            // FRACTIONAL 12b (4096 = 1.0)

temp_long        =     modulus_adj * modulus_shp;
temp_long      >>=     12;                             //
temp_long       *=     MOD_DELTA;
temp_long      >>=     12;                             //
temp_long       +=     PWM_MODULUS_MIN;
modulus          =     (unsigned)temp_long;

temp_long        =     modulus - ((PWM_MIN_PULSE+PWM_DEAD_TIME_0) << 1);
temp_long       *=     N_K;
temp_long      >>=     12;
temp_long       *=     value;
temp_long      >>=     6;
temp_long       +=     PWM_MIN_PULSE+PWM_DEAD_TIME_0;
buck_duty        =     (unsigned)temp_long;
```

FIG. 16

DYNAMIC FREQUENCY AND PULSE-WIDTH MODULATION OF DUAL-MODE SWITCHING POWER CONTROLLERS IN PHOTOVOLTAIC ARRAYS

PRIORITY CLAIM AND INCORPORATION BY REFERENCE

This application claims benefit of priority of U.S. Provisional Application Ser. No. 61/441,585 titled "Regulation of Inverter DC Input Voltage, Pseudo Random Bit Sequence Generation for MPPT, and Dynamic Frequency and PWM of Dual-Mode Switching Power Controllers in Photovoltaic Arrays", filed Feb. 10, 2011, and whose inventors are Shawn R. McCaslin, Sam B. Sandbote, and Bertrand J. Williams, and which is hereby incorporated by reference in its entirety as though fully and completely set forth herein.

BACKGROUND OF THE INVENTION

1. Field of the Invention

This invention relates generally to the field of photovoltaic arrays, and more particularly to dynamic frequency and pulse-width modulation of dual-mode switching power controllers used in photovoltaic arrays.

2. Description of the Related Art

Photovoltaic (PV) arrays—more commonly known and referred to as solar arrays—are a linked collection of solar panels, which typically comprise multiple interconnected solar cells. The modularity of solar panels facilitates the configuration of solar (panel) arrays to supply current to a wide variety of different loads. The solar cells convert solar energy into direct current electricity via the photovoltaic effect, in which electrons in the solar cells are transferred between different bands (i.e. from the valence to conduction bands) within the material of the solar cell upon exposure to radiation of sufficient energy, resulting in the buildup of a voltage between two electrodes. The power produced by a single solar panel is rarely sufficient to meet the most common power requirements (e.g. in a home or business setting), which is why the panels are linked together to form an array. Most solar arrays use an inverter to convert the DC power produced by the linked panels into alternating current that can be used to power lights, motors, and other loads.

The various designs proposed and developed for solar arrays typically fall into one of two configurations: a low-voltage configuration (when the required nominal voltage is not that high), and a high-voltage configuration (when a high nominal voltage is required). The first configuration features arrays in which the solar panels are parallel-connected. The second configuration features solar panels first connected in series to obtain the desired high DC voltage, with the individual strings of series-connected panels connected in parallel to allow the system to produce more current. Various problems have been associated with both configurations, with the most prolific array configuration being the high-voltage series-string based configuration. The series-string configuration raises the overall distribution DC-bus voltage level to reduce resistive losses. However, in doing so it increases panel mismatch losses by virtue of the series-string being limited by the weakest panel in the string. In addition, the resultant DC-bus voltage has a significant temperature and load variance that makes inversion from DC to AC more difficult. Consequently, many design efforts have been concentrated on improving the efficiency of the collection of electrical power from the array, by mitigating these non-idealities.

Various designs have been proposed and developed for DC/DC (DC-to-DC) converter systems applied to solar arrays. Most of these designs have concentrated on the implementation of Maximum Power Point Tracking (MPPT), which employs a high efficiency DC/DC converter that presents an optimal electrical load to a solar panel or array, and produces a voltage suitable for the powered load. Oftentimes the DC/DC converters are implemented with a switching regulator in order to provide highly efficient conversion of electrical power by converting voltage and current characteristics. Switching regulators typically employ feedback circuitry to monitor the output voltage and compare it with a reference voltage to maintain the output voltage at a desired level. While typical regulation may be satisfactory in most applications, when operating DC/DC converters with photovoltaic/solar panels, the requirements associated with such arrays present additional problems that typical regulation cannot adequately address.

For example, one type of commonly used switching power converter in PV array designs featuring DC/DC converters is a Buck-Boost switching power converter. Various solutions exist for improving efficiency in Buck-Boost switching power converters. One widely utilized system-architecture is the dual-mode H-bridge style converter. Several innovations relating to the smooth transition between buck and boost modes for this configuration have been utilized and proposed, each with several fundamental limitations, but none addressing the optimization of efficiency over a wide $V_{in}$ and $V_{out}$ operating range. Since a minimum pulse-width is required for any switching event, the transition between buck mode and boost mode involves an abrupt event. Prior solutions address this abrupt event by creating a third mode which is equivalent to a much older, and less efficient, technique, where the 4-switches are all simultaneously utilized in a single continuous mode to alternately transfer current through the primary inductor to emulate a buck and boost function.

Many other problems and disadvantages of the prior art will become apparent to one skilled in the art after comparing such prior art with the present invention as described herein.

SUMMARY OF THE INVENTION

Various embodiments of a novel control method for controlling switching power converters such as buck/boost power converters take advantage of the fact that at the buck/boost boundary the voltage across the inductor is nearly zero for almost the entire cycle, since the input voltage is approximately the same as the output voltage. Therefore, the switching frequency required to support optimal operation may be significantly reduced in this mode. Accordingly, it may be desirable to track the optimal switching frequency over the range of duty-cycle ratios in each mode. For example, if the switching frequency is reduced by a factor of 10 at the boundary, the jump of the output voltage across the boundary may also be reduced by a factor of 10, and any effect on regulation or noise may be more easily mitigated. Furthermore, since the power consumed by the FETs in the power converter may have a strong switching component related to the switching frequency, the potential efficiency for the converter may be significantly improved within a region around the boundary.

To achieve this, a digital mapping interpreter algorithm may be implemented to intercept the input duty-cycle value from the control-system, and translate the duty-cycle value to two parameters, a pulse-width value and a modulus value. The duty-cycle value is typically provided to a pulse-width modulation (PWM) generator as a single-variable pulse-width function with a fixed divider modulus setting the fixed switching frequency. These two new parameter values may then be used to simultaneously modulate the pulse-width and pulse period, while maintaining an appropriate linear final duty-cycle ratio:

normalized duty-cycle=pulse-width/pulse-period.

Thus, in one set of embodiments, a control system may include an input to receive a duty-cycle value, and may further include a conversion block to generate a modulus value and a pulse-width value (PWV) based on the received input duty-cycle value. A pulse generator within the control system may generate a pulse-width modulated (PWM) signal having a frequency determined by the received modulus value, and a pulse-width determined by the PWV. The PWM signal may be provided through an output of the control system to a switching power converter to control switching of the switching power converter. The conversion block may implement a warp function that maps the modulus value to the input duty-cycle value, and may also implement a second function that maps the PWV to the modulus value and to the input duty-cycle value to maintain a desired linear ratio between the PWV and the pulse period of the PWM signal.

In one embodiment, a power converter includes a signal generating circuit that receives an input duty-cycle value and generates a modulus value and a PWV based on the received input duty-cycle value, and generates a PWM signal having a frequency determined by the received modulus value, and having a pulse-width determined by the PWV. The power converter also includes a control system that monitors parameters of the power converter, the parameters including input voltage, input current, output voltage, and output current, generates the input duty-cycle value based on the monitored parameters, and supplies the input duty-cycle value to the signal generating circuit. The signal generating circuit may be programmable with a mapping algorithm that maps the modulus value to the input duty-cycle value, and maps the PWV to the modulus value and to the input duty-cycle value to maintain a specified relationship between the PWV and an instantaneous frequency of the PWM signal. In some embodiments, the signal generating circuit may include a divider circuit that receives a first clock signal and the modulus value, and generates a divider modulus control signal based on the first clock signal and the modulus value. The signal generating circuit may further include a pulse generator/digital timer to generate the PWM signal according to the divider modulus control signal and the PWV. A switching power core of the power converter may receive the PWM signal, and generate the output voltage of the power converter according to the PWM signal.

A switching power converter may be controlled by generating a modulus value and a PWV from a duty-cycle value (DCV), and generating a PWM signal by setting a pulse period corresponding to an instantaneous frequency of the PWM signal according to the modulus value, and setting a pulse-width of the PWM signal according to the PWV. The PWM signal may be provided to a switching power core to control the switching of the switching power converter. Generating the modulus value may involve mapping the modulus value to the DCV according to a specified mapping function, and generating the PWV may involve mapping the PWV to the modulus value and to the DCV. The modulus value and the PWV may further be generated such that a specified functional relationship is maintained between the PWV and the pulse period. In some embodiments, the specified functional relationship is a specified linear relationship.

In various embodiments, dynamic pulse-width and frequency modulation is used to control switching of a switching power converter. First, the DCV for a PWM signal is calculated according to a number of parameters that may include the input voltage, input current, output voltage, and output current of the switching power converter. The DCV is translated to a first parameter and a second parameter, and the pulse-width (PW) and pulse period (PP) of the PWM signal is simultaneously modulated by modulating the PP according to the first parameter and modulating the PW according to the second parameter, while maintaining a specified functional relationship between the PW and the PP of the PWM signal. Maintaining the specified functional relationship between the PW and the PP of the PWM signal may involve maintaining a linear relationship between the PW and the PP of the PWM signal.

In translating the DCV to the first parameter and the second parameter, the first parameter may be mapped to the DCV according to a function setting the value of the first parameter based on the DCV and a specified DCV range, a specified minimum value for the first parameter, and/or a specified maximum value for the first parameter. Similarly, the second parameter may be mapped to the first parameter and to the DCV according to a function determining the value of the second parameter based on the DCV, the first parameter, a minimum value for the PWV, and/or a specified DCV range.

BRIEF DESCRIPTION OF THE DRAWINGS

The foregoing, as well as other objects, features, and advantages of this invention may be more completely understood by reference to the following detailed description when read together with the accompanying drawings in which:

FIG. 16 shows an example C++ routine to implement a mathematical warping function on a 16-bit fixed point embedded controller.

Figure 1:
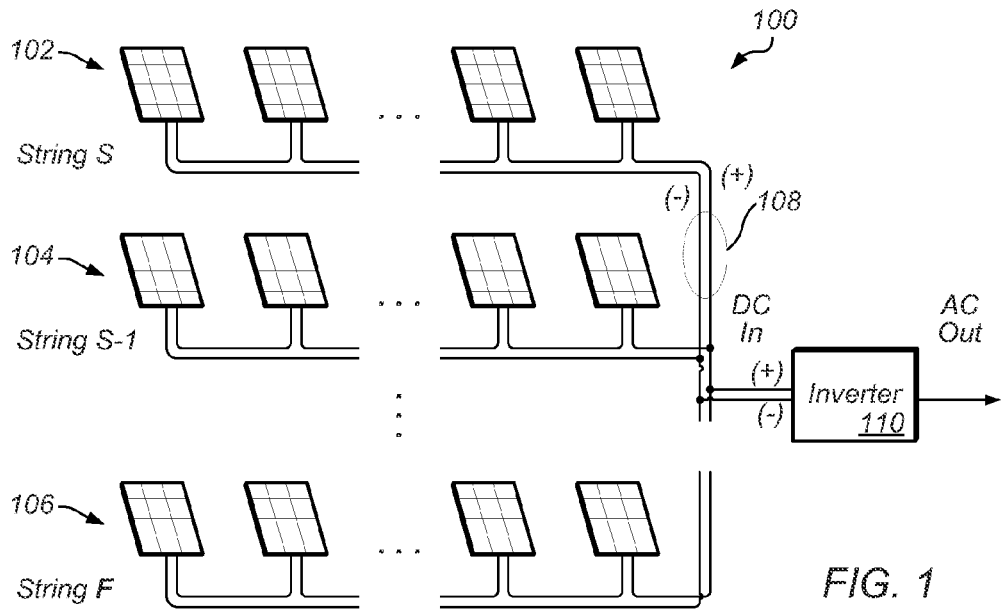
FIG. 1 shows an example diagram of a conventional series-string and parallel branch solar array configuration.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

In solar array systems, many non-idealities may be mitigated by utilizing distributed Maximum Power Point Tracking (MPPT). Distributed MPPT usually includes insertion of a DC/DC converter or a similar power converter behind solar panels in the array, most commonly behind each and every solar panel in the array, to adapt the coupled solar panel's power transfer onto a high-voltage bus (typically a high-voltage DC bus) which connects the panels together via the DC/DC converters. A typical solar array 100 is shown in FIG. 1. Solar panel series-strings 102, 104, and 106 are coupled in parallel to bus 108, which may be a DC/DC bus. Each solar panel series-string includes solar panels coupled in series to a respective bus, each of those respective buses coupling to bus 108 as shown to obtain parallel-coupled solar panel series-strings. An inverter 110 is coupled to bus 108 to ultimately drive a connected load, which may be coupled to the output of inverter 110.

Figure 3:
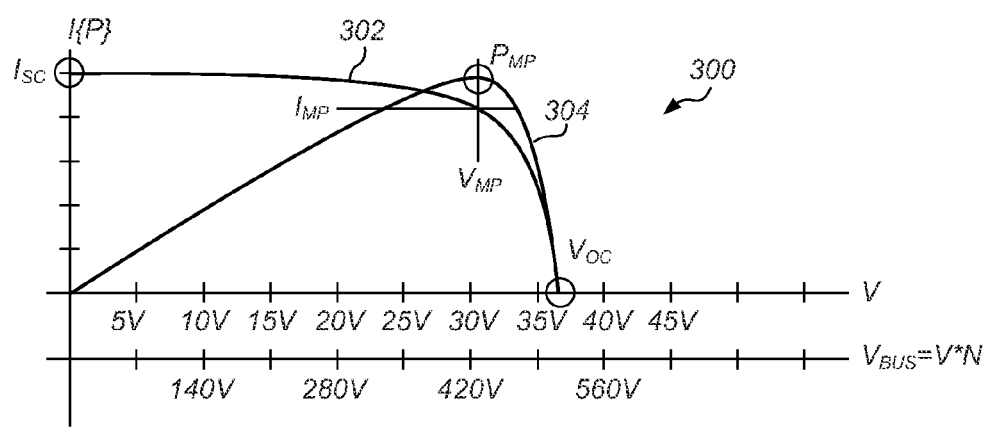
FIG. 3 shows an example V/I power curve for a series-string solar array configuration.

An example of the V/I (voltage/current) characteristic for each solar panel is shown in FIG. 3. As seen in FIG. 3, the V/I characteristic may be modeled as a current source in parallel with a multiplied shunt diode, where the current is proportional to the solar insolation levels, and the shunt diode is the result of the solar cell diode in each cell multiplied by the number of cells in series which make up that solar panel. Curve 302 represents the V/I curve, that is, the current I output by the solar panel (represented on the vertical axis) for a given output voltage V (represented on the horizontal axis). Curve 304 represents the power curve associated with V/I curve 302, showing the maximum power point $P_{MP}$, that is, the point at which the product of the current and voltage output by the solar panel is at its maximum. These values are indicated as $I_{MP}$ and $V_{MP}$, respectively, and $I_{MP}*V_{MP}=P_{MP}$. $V_{OC}$ indicates the open circuit voltage output by the solar panel, that is, the voltage output by the solar panel when not providing current to a load. Similarly, $I_{SC}$ indicates the short circuit current output by the solar panel, that is, the current output by the solar panel with its output terminals shorted together. $V_{BUS}$ indicates the total voltage that appears on the bus for N solar panels connected in the series-string.

Figure 4:
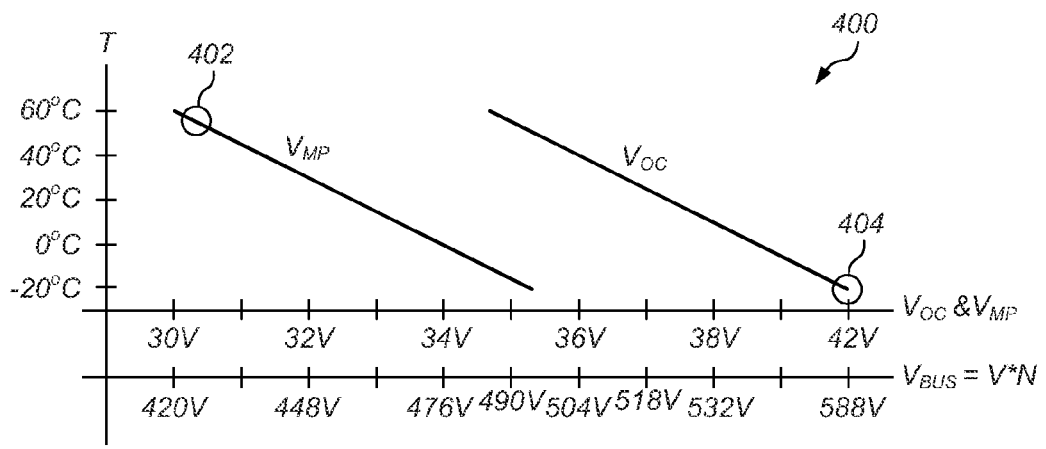
FIG. 4 shows an example $V_{OC}$ & $V_{MP}$ vs. temperature curve for a typical solar panel.

Turning now to FIG. 4, the open circuit voltage $V_{OC}$ of the solar panel may be set by the current—generated as a result of solar insolation—shunted by the series multiplied diode elements. As determined by the shunt diodes within the cell, this voltage may exhibit temperature variance similar to a silicon diode junction. The $V_{OC}$ for a solar panel may thus increase with decreasing temperature, and vice-versa, as indicated by the $V_{OC}$ curve shown in FIG. 4. Consequently, in order for the maximum bus voltage (maximum $V_{BUS}$) to comply with NEC (National Electrical Code) standards, the number of solar panels that may be connected in series at a given site needs to be determined based on the expected coldest temperature at that site. The bus specification usually limits the maximum value of $V_{BUS}$ to 600V in a US NEC compliant system. It should also be noted that at high temperatures, and while under load, the bus voltage may be substantially lower than the allowed operating level for the Bus. Point 402 on the $V_{MP}$ curve indicates the typical $V_{MP}$ condition, and point 404 on the $V_{OC}$ curve indicates a typical $V_{OC}$ condition.

Use of a properly designed respective adaptive DC/DC converter coupled to each solar panel in a solar panel array allows for modification of the curves shown in FIG. 4, under algorithmic control of the DC/DC converters. In order to calculate how many panels may be placed in series, the following equation may be used:

$$N=\text{Integer}(V_{BUS\text{-}max}/V_{OC\text{-}p}), \quad (1)$$

where $V_{BUS\text{-}max}$ is the maximum value of $V_{BUS}$, e.g. 600V when observing NEC standards, and $V_{OC\text{-}p}$ is the maximum value of $V_{OC}$ for any given panel utilized in the array, at the minimum site location temperature. For example, if $V_{BUS\text{-}max}$=600V, and $V_{OC\text{-}p}$=42V:

$$N=\text{Integer}(600V/42V)=\text{Integer}(14.28)=14. \quad (2)$$

Therefore, 14 panels of this type may normally be placed in series for a cold temperature $V_{BUS\text{-}OC}$=~14*42V=588V. According to the V/I curve 402, which corresponds to high temperature and operation at the maximum power point, in FIG. 4, $V_{MP}$ at 45° C. is close to 30.5V, resulting in a bus voltage value of $V_{BUS}$=~14*30.5V=427V under normal operating conditions for this example.

During normal operation, each panel may therefore contribute ~32V to the total bus voltage for the solar panel array string under. Assuming a case of shading, damage, or extreme mismatch, which may result in a given percentage of the solar panels in each string not providing normal power, the $V_{MP}$ bus voltage level may decrease by the amount that the given percentage of the solar panels fails to provide. For example, 20% of the solar panels in a given series-string failing to function normally may lead to a normal operating voltage of the series-string of $V_{BUS}$*~80%=358V, which represents a substantial drop. If other series-strings (of solar panels) maintain the bus voltage at $V_{BUS}$=448V under normal conditions, the given series-string may produce no power at all, and may come close to act as a shunt diode load on the high-voltage DC bus (e.g. bus 108 shown in FIG. 1).

In this example, to design a DC/DC converter unit to isolate the panel voltage from the Bus voltage to alleviate the problem, the desired operating points may be specified by determining the number of panels, and thus converter modules, to be connected in series. For $V_{BUS\text{-}MAX}$ (i.e. maximum bus voltage) conditions, each converter module may be limited to $V_{O\text{-}MAX}$=600V/14=42.85V, comparable to the panel $V_{OC}$, that is, $V_{OC-p}$. Furthermore, each module may be operated sufficiently below this level, to ensure that when a specified percentage (e.g. 15%) of the number of the solar panels are dysfunctional, the remaining modules may successfully boost up their voltage, staying below $V_{O\text{-}MAX}$, to compensate for lost voltage in that string. In the specific example provided, the preferred output operating voltage for each DC/DC converter module may thus be expressed as:

$$V_{O\text{-}nom} \leq (12/14*42.85V) \leq 36.7V, \text{ and thus,} \qquad (3)$$

$$V_{BUS} = 36.7V*14 = 513.8V, \text{ normally.} \qquad (4)$$

More generally, the nominal output voltage for each solar panel may be determined by dividing the number of functioning panels by the total number of panels in the series-string, and multiplying the result by the maximum output voltage of each solar panel. In this example, the bus voltage at the normal operating point may be improved by 15%, reducing the DC bus losses by ~32%. The resulting system may therefore become tolerant of two panels in each string becoming non-functional, fully or partially, while maintaining power from the other panels. In cases of less than fully non-functional operation, many of the panels may be degraded substantially for the same recovery level.

Maximum Power Point Tracking

Figure 2A:
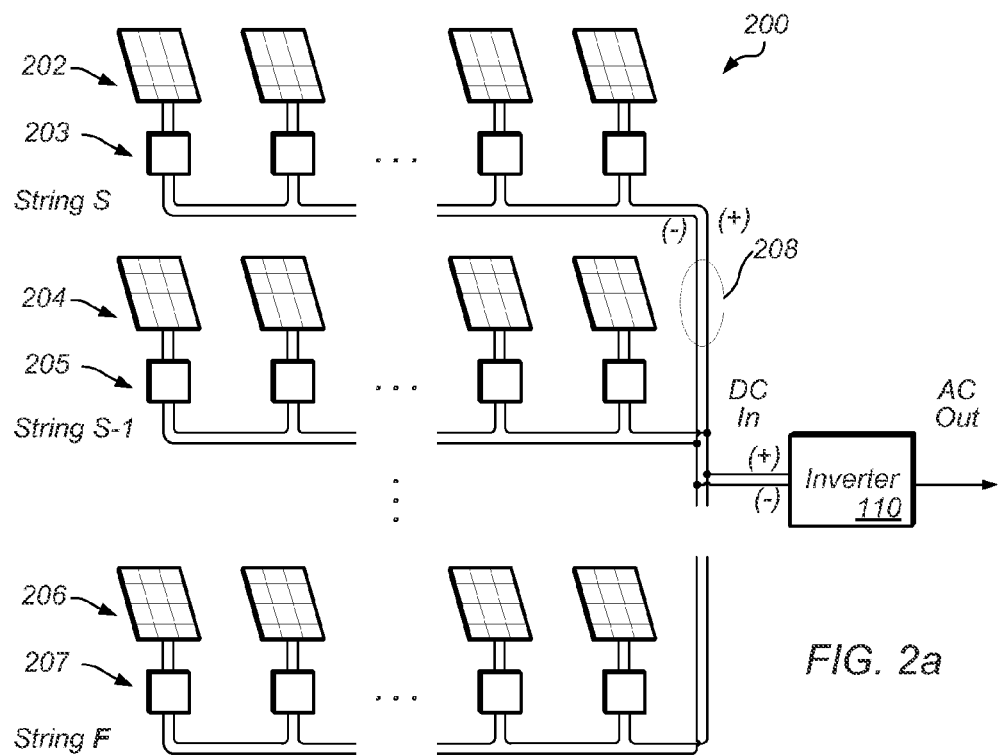
FIG. 2a shows an example of a series-string solar array configuration retrofitted with DC/DC converters attached to the solar panels.
Figure 5:
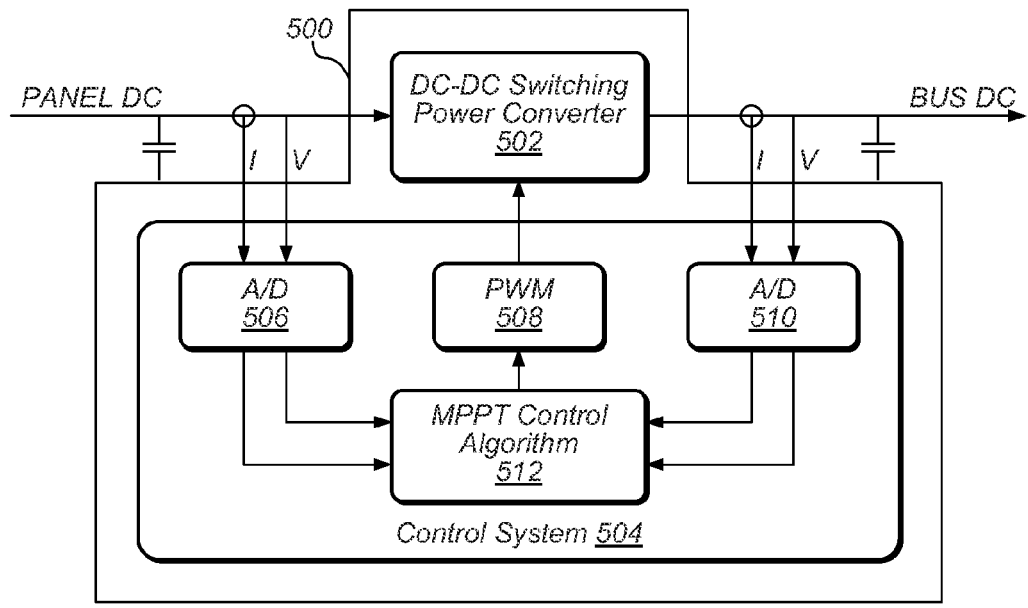
FIG. 5 shows an example Architecture for a direct MPPT controlled DC/DC Converter.

FIG. 2a shows one embodiment of a system 200 featuring solar panel series-strings 202, 204, and 206, with each of solar panels 202, 204, and 206 coupled to a respective power converter unit of power converter units 203, 205, and 207, respectively. In this case, power converter units 203, 205, and 207 may each include a control unit and a power converter controlled by the control unit, and providing a voltage for the respective bus to which the given string is coupled, with the buses coupling to bus 208 in parallel as shown. Thus, respective outputs of the power converters and controllers 203 are series coupled to high voltage DC bus for String S, the respective outputs of the power converters and controllers 205 are series coupled to high voltage DC bus for String S-1, and the respective outputs of the power converters and controllers 207 are series coupled to high voltage DC bus for String F, with the three buses parallel coupled to high voltage DC bus 208. Inverter 110 may be coupled to bus 208 in system 200, to drive a connected load(s). For the sake of clarity, each power converter and controller will be referred to herein simply as a "converter unit", with the understanding that each converter unit may include a power converter, e.g. a DC/DC switching converter, and all associated control circuitry/unit, e.g. functional units to perform MPPT. Each of the attached converter units 204 may be designed to execute a control algorithm, which may exercise control over a switching power conversion stage. The internal structure of one embodiment of a typical converter unit 500 is shown in the block diagram of FIG. 5. Converter unit 500 may include a control system 504 implementing a single control loop to perform MPPT control of switching converter 502. The input voltage and input current from the solar panel may be sensed and sampled by A/D converter 506, and the output voltage and output current from switching converter 502 may be sensed and sampled by A/D converter 510. These sampled values may be processed using control algorithm 512 to calculate the power, and the duty-cycle of the switching signal provided to switching converter 502. For example, control algorithm 512 may be implemented in hardware, it may be implemented as instructions executed by a microcontroller/processor, or as a combination of both, and may use the sampled values directly to produce the required Pulse-Width Modulated (PWM) signal 508 to achieve the conversion characteristics that maintain the solar panel at its maximum power point. It should also be noted, that analog implementation of control system 504 is possible and contemplated, in which case A/D converters 506 and 510 would not be required.

Figure 2B:
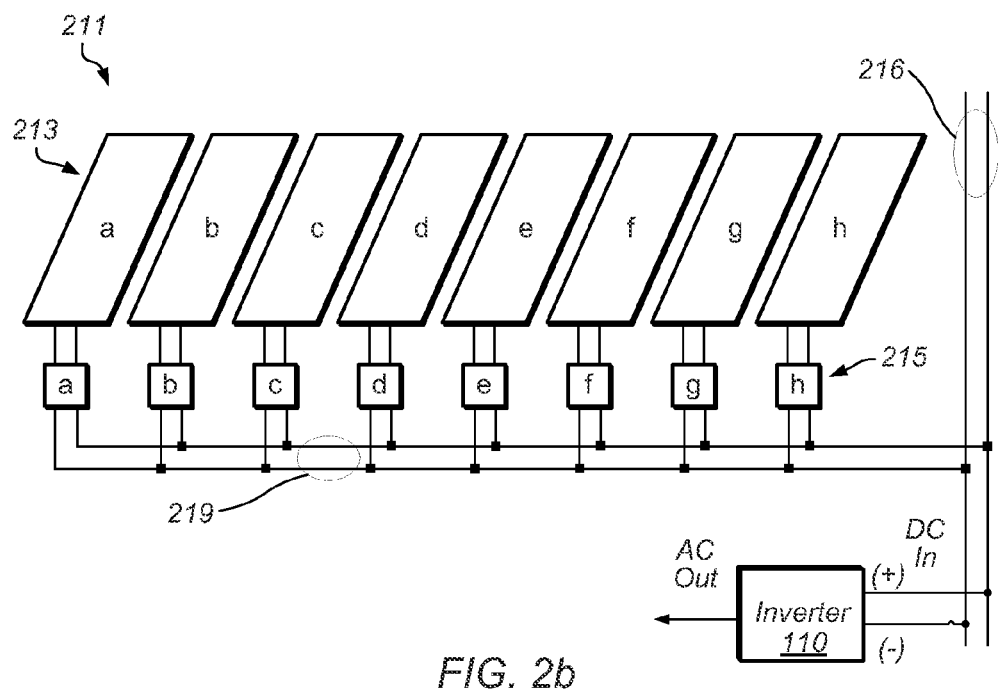
FIG. 2b shows an example of a parallel-string (parallel connected) solar array configuration with DC/DC converters attached to the solar panels.

In alternate embodiments, the respective outputs of the power converters and controllers 204 may be parallel coupled to high voltage DC bus 208, which may be coupled to high voltage DC bus 206. FIG. 2b shows one embodiment of a system 211 featuring a solar panel parallel-string 213, in which each of solar panels 213 a-h is coupled to a respective converter unit 215 a-h. Converter units 215 a-h may also each include a control unit and a power converter providing a voltage for bus 219, and controlled by the control unit. For example, panel 213a is coupled to converter unit 215a, panel 213b is coupled to converter unit 215b, and so on. The respective outputs of the power converters and controllers 215 are then parallel coupled to high voltage DC bus 219, which may be coupled to high voltage DC bus 216. Each of the attached converter units 215 may be designed to execute a control algorithm, which may exercise control over a switching power conversion stage. For a more detailed presentation, please refer to U.S. patent application Ser. No. 12/314,050, fully incorporated herein by reference. Possible embodiments of converter unit 205 are provided in FIG. 5 and FIG. 7. Again, an inverter 110 may be coupled to bus 216 in system 211, to provide AC power to a connected load(s).

Many algorithms currently exist for determining and maintaining MPPT operation in a system such as system 200, including Hill Climbing, Zero Derivative, Fuzzy Logic, etc. While such algorithms are applicable to these systems, each has its own advantages and disadvantages. The choice of algorithm type may be determined by a compromise of dynamic tracking characteristics, precision, and/or tracking bandwidth against desired results. Most algorithms may be considered equivalent of each other and equally applicable to a static system. Dynamic conditions typically occur during variable cloud shading and similar events, where the characteristics of the solar panel connected to the converter unit, as well as all of the other solar panels in the string may be affected rapidly. Under these conditions, converter units, such as converter unit 500 shown in FIG. 5, may not be able to provide a satisfactory response time. In one set of embodiments, a novel converter unit may implement a fast algorithm to track the dynamic conditions, and a slow algorithm to maintain accuracy and precision of the MPPT operating point. In some embodiments, an MPPT algorithm may include a pseudo-random sequence, which may be encoded to provide a DC balance, such that the resulting voltage probe at the input port has improved tracking and dynamic response.

Dual-Loop Fast Tracking MPPT:

Possible responses of the converter unit may be categorized as falling into one of two basic categories: a response to provide accurate MPPT, and a response to meet the needs for fast adaptive tracking One solution may be derived from the unique characteristics of the solar panel V/I curve during most fast transients. A typical transient under consideration might be a cloud passing over the solar panels, producing a variable insolation level transient.

Figure 6:
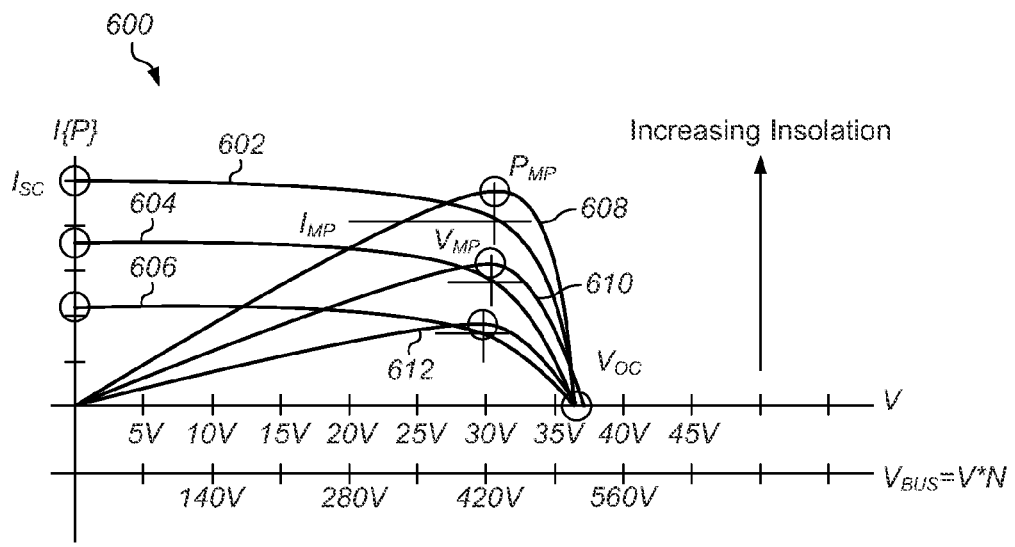
FIG. 6 shows an example V/I Curve for a typical solar panel at different insolation levels.

The graph 600 in FIG. 6 shows V/I curves for a given solar panel under three substantially different insolation levels. V/I curve 602 corresponds to a highest insolation level, V/I curve 604 corresponds to a lower insolation level, and V/I curve 606 corresponds to a lowest insolation level. Power curves 608, 610, and 612 in graph 600 are the power curves corresponding to V/I curves 602-606, respectively. As seen in graph 600, the current I generated by the solar panel is substantially reduced at lower insolation levels. In fact, it is typically the case that the current I is directly proportional to the insolation level. As a result, and as also seen in graph 600, the voltage at which MPPT is achieved remains substantially static, and varies very little over a transient of different insolation levels. In other words, the desired voltage $V_{MP}$ varies minimally, if at all, with respect to changing insolation levels. Consequently, early control systems for solar panels did not include a MPPT mechanism at all, but rather just operated the solar panel at a fixed voltage under all conditions, with the fixed voltage presumed to be near the desired MPPT voltage. However, such systems are not adaptive, and consequently cannot determine what the proper operating voltage for that given panel or string should be. Because of their lack of accuracy, the operation of such systems results in substantially reduced power transfer.

Figure 7:
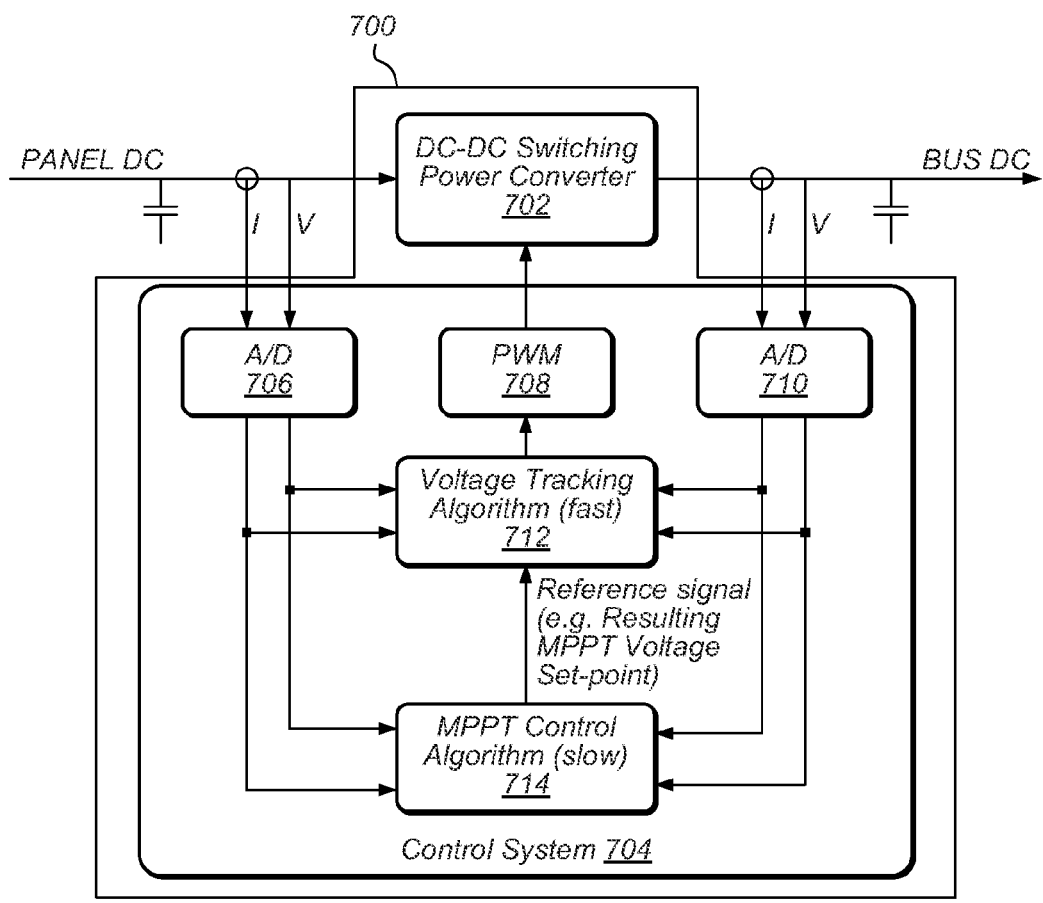
FIG. 7 shows one embodiment of a DC/DC converter controller that features an inner control loop regulating to $V_I$, and an outer MPPT control loop that sets the value for $V_I$.

One embodiment of an improved converter unit and method for achieving a fast response time together with accurate MPPT is shown in FIG. 7. Converter unit 700 may include a fast tracking inner control loop, which may be a fast tracking voltage regulating loop 712, and a slower MPPT tracking loop 714 utilized to set the "Reference" point for the inner control loop 712. In the embodiment shown, the Reference point is the reference voltage for the fast tracking inner control loop 712. The Reference point may be provided by MPPT loop 714 in the form of a control signal, whether analog or digital, to the inner voltage regulating loop 712, to determine what reference point (in this case reference voltage) the control system 704 should regulate to. The inner fast tracking loop 712 may directly control the DC/DC conversion duty-cycle of PWM control signal 708 for switching converter 702, and the outer MPPT loop 714 may continually monitor and average the power conditions to instruct the inner loop 712 what voltage value regulation should be performed to. Again, A/D converter 706 may be used to sense and sample the input voltage and current obtained from the solar panel, and A/D converter 710 may be used to sense and sample the voltage and current output by switching converter 702. However, in case of analog implementations, there is no need for A/D converters 706 and 710. Inner control loop 712 may be designed to monitor one or more of the input-ports (I and V received from the solar panel) and output-ports (I and V received from the output of power converter 702). Accordingly, converter unit 700 may include a total of four input ports, a first pair of input ports to receive input-port voltage and current from the solar panel, and a second pair of input ports to receive output-port voltage and current from power converter 702. It may also include an output port to provide the control signal to power converter 702 via PWM 708.

In one embodiment, fast tracking loop 712 may include a hardware PWM controller generating the PWM control signal 708 using analog and digital hardware functions, for a fully hardware-based control system. In another embodiment, fast tracking loop 712 include a microcontroller based system utilizing A/D and PWM peripherals implementing the fast tracking loop as a combination of hardware and firmware. Choices of embodiments including hardware and/or software implementations or a combination thereof may be based upon cost and performance criteria for the intended system while maintaining equivalence from an architectural perspective disclosed in at least FIG. 7.

MPPT algorithms typically use some form of dithering to determine a derivative of the Power vs. Voltage conditions, or to determine and maintain operation at the maximum power point. In converter unit 700, this dithering may now be performed by control system 704 dithering the reference signal (e.g. the resulting MPPT set-point, which may be an MPPT voltage set-point for regulating the input-port voltage, that is, the voltage input to A/D 706 and into converter 702) to the inner loop 712, rather than by directly modulating the duty-cycle of PWM signal 708. The advantages of the dual-loop structure in converter unit 700 include improved stability of the system, and very fast acquisition and tracking of the system during transients. Other advantages that may also be derived from the architectural partitioning into two control loops include current-mode operation of the inner Vin regulating control system, that is, current-mode operation of the inner control loop 712. Current-mode operation offers several advantages, including excellent tradeoff between stability and tracking speed, over-current protection and limiting, and automatic pulse-skipping during discontinuous-mode operation. Current-mode operation of fast tracking inner loop 712 may be particularly attractive, and easily enabled, when fast tracking inner loop 712 is implemented fully in hardware.

Dynamic Frequency and PWM of Dual-Mode Switching Power Controllers

Since the efficiency of a power converter is related to the losses in the system compared to the power transferred through the system, it may be advantageous to reduce the losses for a given power level. Losses for a DC/DC converter can typically be lumped into several categories: transistor switching losses, transistor and diode resistive losses, core losses in the magnetics, resistive losses in the magnetics, control power used, and other miscellaneous resistive losses, including current sensing, etc.

In applications where the system is designed for high power levels, and the power is substantially reduced as a result of certain conditions, transistor switching losses may oftentimes become substantially dominant at the reduced, lower power levels. The control algorithm for the PWM controller may be modified to adjust the switching rate or timing at lower power levels to accommodate these conditions. By separating the input voltage regulating loop 712 from the MPPT loop 714, more complex PWM control may be introduced into the design of the inner loop 712. Because regulation in MPPT is in effect performed for optimizing power (specifically finding the maximum power point), a single loop may not be able to easily integrate dependent functions such as dynamic pulse skipping based on current. While it may be possible to implement such functionality in a single loop, it may prove overly difficult to do so, and the complexity and computational burden on microcontroller firmware may have to be substantially increased. Use of certain analog current mode controllers for implementation of the inner voltage regulation loop 712 may allow natural implementation of higher efficiency power converters.

DC/DC converter 702 may be designed to take advantage of the fact that the PWM duty-cycle is proportional to the power being transferred in the general case, and as the PWM duty-cycle drops below a predetermined level, the on time of the power output stage of converter 702 may be held constant while the off time is increased, effectively reducing the switching rate and the related transistor switching losses. In addition, since it may no longer be necessary or desirable to hold the on time constant while decreasing the off time below a predetermined lower duty cycle value, the rate may then be held, and the duty-cycle again returned to conventional operation down to approaching 0%. This hybrid mode operation allows for optimization of the losses over a much broader range of power levels, especially in the crucial range where the input power is lower than normal. This feature may be implemented as a firmware controlled feature, or it may be implemented directly within analog and/or mixed signal hardware peripherals to the microcontroller, or it may be implemented based upon a conventional analog current mode architecture. Furthermore, when the power converters coupled to the solar panels are connected in parallel (e.g. refer to FIG. 2b, and U.S. patent application Ser. No. 12/314,050, fully incorporated herein by reference), the fast tracking inner loop may be operated to adjust the output voltage of power converter 702 based on the Reference signal, as opposed to adjusting the input voltage of power converter 702.

As previously mentioned, one widely utilized system architecture for the DC/DC power converters used in converters coupling to PV panels (e.g. DC/DC switching converters 502 and 702) is the dual-mode H-bridge style converter. As also previously mentioned, several innovations relating to the smooth transition between buck and boost modes for this configuration have been utilized and proposed, but each of these innovations still comes with several fundamental limitations, and fails to address the optimization of efficiency over a wide $V_{in}$ and $V_{out}$ operating range.

Various embodiments disclosed herein relate to the control and regulation algorithms for switching power controllers, especially dual-mode H-bridge configured Buck-Boost systems. Focus is on optimization of the converter by utilization of a dynamically computed frequency and pulse-width mapping function to achieve both a smooth transition across the buck/boost boundary as well as optimal switching power efficiency over a very wide input voltage $V_{in}$ and output voltage $V_{out}$ range.

Various embodiments of power converters with improved controller functionality may include a hardware system with a PWM controller having the capability for reconfiguring both the switching frequency and the pulse-width on a dynamic basis. The H-bridge configured switching power core hardware may be controlled by these PWM signals, operating in one of either a buck or boost mode. A mathematical function and control algorithm implemented in the controller may minimize the transient discontinuities present when transitioning across the Buck/Boost boundary, and may simultaneously optimize the switching efficiency over a very wide $V_{in}$ and $V_{out}$ range.

Figure 8:
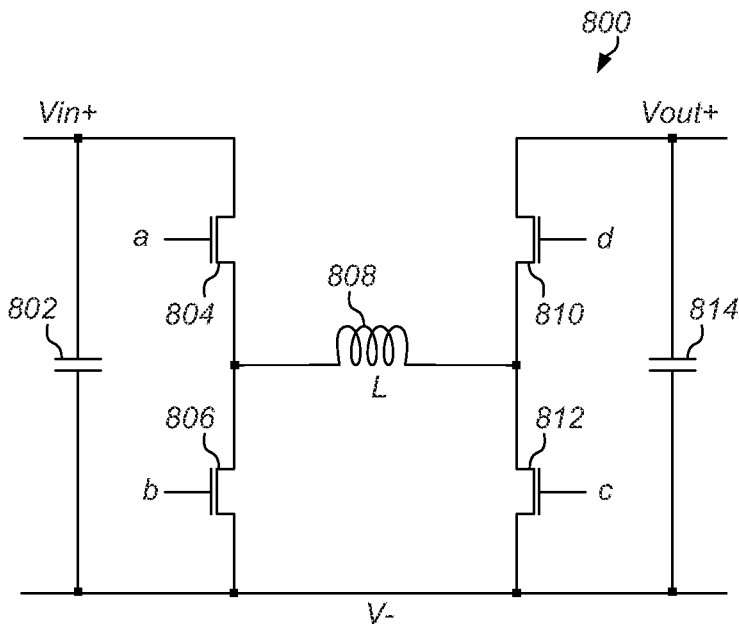
FIG. 8 shows the partial circuit diagram of one embodiment of an H-Bridge Dual-Mode Buck-Boost Switched Power Core.

FIG. 8 shows the partial circuit diagram of one embodiment of an H-Bridge Dual-Mode Buck-Boost Switched Power Core 800, which includes input FETs 804 and 806, coupled to output FETs 810 and 812 via inductor 808 having an inductance value 'L', with input capacitance 802 coupled between Vin+ and V−, and output capacitance 814 coupled between Vout+ and V−. As shown in FIG. 8, control terminals (i.e. gate terminals for FETs) a, b, c, and d may receive respective control signals (a, b, c, d) for FETs 804-812 to control the switching of power core 800.

Figure 9:
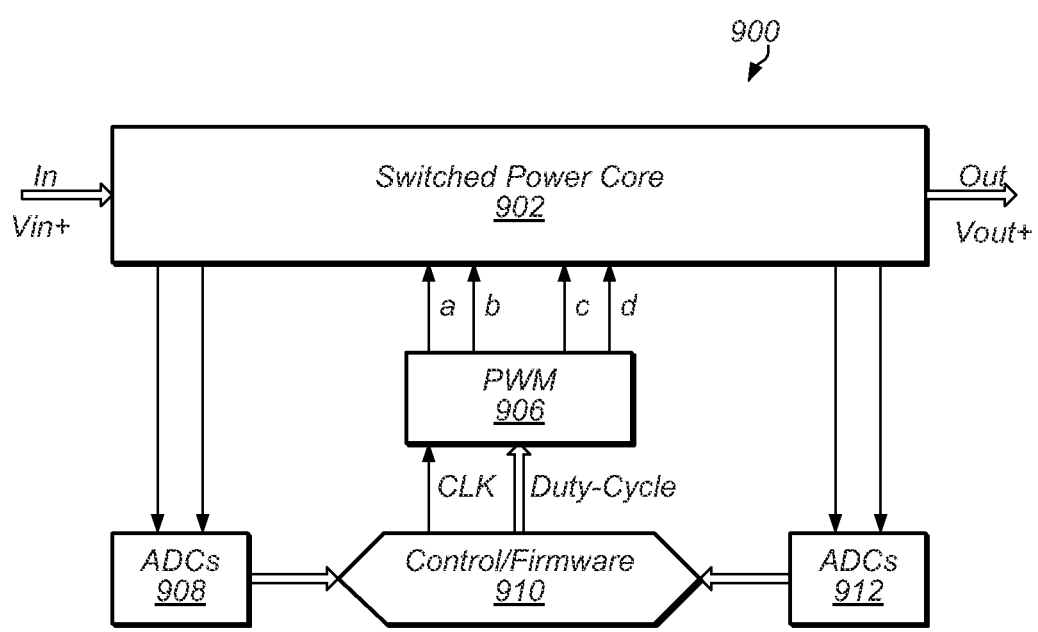
FIG. 9 shows the partial block diagram of one embodiment of a conventional switching power controller/converter.

FIG. 9 shows the partial block diagram of one embodiment of a conventional switching power controller/converter 900, in which a switched power core 902 is an H-Bridge Dual-Mode Buck-Boost Switched Power Core, which is controlled by a PWM signal (a, b, c, d) generated by PWM signal generator 906. The duty-cycle of the PWM signal(s) is determined by controller 910. Controller 910 may provide a duty-cycle value to PWM generator 906 based on the monitored values of the input and output voltage and current of switched power core 902. These monitored values which may be digitized via ADCs 908 and 912, respectively, and may be provided as digital input parameters into controller 910. PWM generator 906 may then provide four PWM signals a, b, c, and d to the switched power core 906, each of the four PWM signals controlling a respective corresponding one of the four transistors shown in FIG. 8. That is, PWM signal 'a' may control transistor 804, PWM signal 'b' may control transistor 806, PWM signal 'c' may control transistor 812, and PWM signal 'd' may control transistor 810, as shown.

When considering the Buck/Boost boundary for a 4-switch dual-mode DC/DC converter, the PWM states on each side of the boundary may first be assessed. Since the boundary exists precisely at the region where $V_{out}=V_{in}$, it may be simple to project the desired states for each of the Buck and Boost modes at the boundary. Considering the Buck mode, it may be desirable for the duty-cycle ratio to approach 1.0, or 100% pulse-width while getting closer to the boundary. For the Boost mode, while leaving the boundary, it may be desirable for the duty-cycle ratio to approach 0.0 or 0%. In both of cases a practical consideration may prevent this from occurring. Specifically, the consideration that a finite minimum pulse-width (e.g. measured in nsec) is required for the PWM signal to drive the FET gate, and for the FET to practically switch. Therefore on each side of the boundary, the duty-cycle ratio may be limited to a finite ratio. For example, a minimum pulse-width of 100 nsec within a PWM period of 5 µsec (corresponding to a frequency of 200 kHz) represents a duty-cycle ratio of +/−0.02, or 2%. Given this ratio, $V_{out}/V_{in}$ may jump from a 0.98 duty-cycle ratio in buck mode, to a 1.02 duty-cycle ratio in boost mode. For example, for $V_{in}=V_{out}=40V$, with $V_{in}$ remaining at 40V, the output may jump from ~39.2V to ~40.8V, a 4% change of 1.6V. This discontinuity, in an otherwise smooth $V_{out}/V_{in}$ curve may present considerable problems related to regulation and noise. It should be noted that the values provided above are for informational purposes, and the analysis provided above may be performed with any desired values used for the pulse-width, PWM period, $V_{in}$ and $V_{out}$.

Various embodiments of novel power converters/controllers proposed herein take advantage of another characteristic of this switching power architecture, more specifically the fact that at the Buck/Boost boundary the voltage across the inductor is nearly zero for almost the entire cycle, since $V_{in} \approx V_{out}$. This also implies that the switching frequency required to support optimal operation may be significantly reduced in this mode. Therefore, it may be desirable to track the optimal switching frequency over the range of duty-cycle ratios in each mode. Referring to the example provide above, if the switching frequency is reduced from 200 KHz to 20 KHz at the boundary, the $V_{out}$ jump across the boundary may only be 160 mV, instead of 1.6V, and any effect on regulation or noise may be more easily mitigated. In addition, since the power consumed by the FETs may have a strong switching component related to the switching frequency, the potential efficiency for the converter may be significantly improved within a region around the boundary.

To achieve this, a digital mapping interpreter algorithm may be implemented to intercept the input duty-cycle value—which may normally be provided to the PWM generator as a single-variable pulse-width function with a fixed divider modulus setting the fixed switching frequency—from the control-system, and translate the duty-cycle value to two variables, a pulse-width value and a modulus value. These two values may then be used to simultaneously modulate the pulse-width and pulse-period, that is, the pulse-width and the instantaneous frequency of the PWM signal, while maintaining an appropriate linear final duty-cycle ratio=pulse-width/pulse-period (where the pulse-period corresponds to the instantaneous frequency of the PWM signal).

Because the PWM period may be increased over most of the operating region, the effective PWM resolution may be improved if the mapping function is appropriately managed to utilize the two-variable equations to re-map a higher-resolution input range into this new output function. Improvements on the order of 4× to 5× may be easily obtained, substantially improving the utilization of medium-resolution to low-resolution PWM generators, lowering the resultant noise level, and eliminating or substantially reducing control-system limit-cycle considerations with such hardware.

Figure 10:
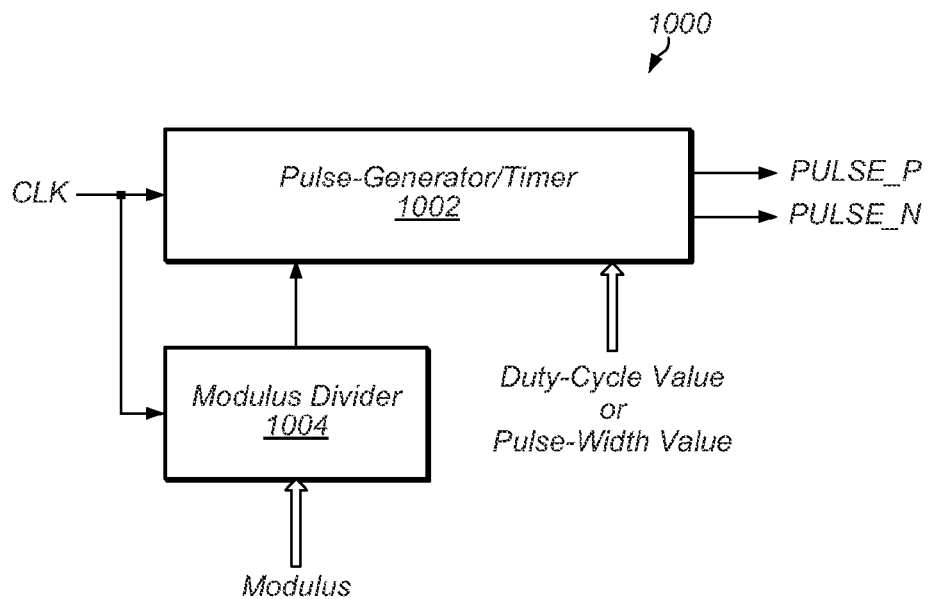
FIG. 10 shows the partial block diagram of one embodiment of a pulse-width generator.

FIG. 10 shows the partial block diagram of one embodiment of a pulse-width generator (PWG) 1000, which may receive two parameters instead of receiving only a duty-cycle value. A modulus divider 1004 within PWG 1000 may receive a modulus input value and provide a divider modulus to pulse generator/timer 1002 for setting the frequency of the output pulses. Thus, if the received divider modulus value is a constant, the frequency of the output pulses will also be constant. Pulse generator/timer 1002 may also receive the duty-cycle value input or a pulse-width value input for setting the effective pulse-width of the PWM output signals. PWG 1000 may be used for controlling a switched power core (e.g. power core 800) in such a way as to minimize the transient discontinuities present when transitioning across the Buck/Boost boundary, and simultaneously optimize the switching efficiency over a very wide $V_{in}$ and $V_{out}$ range by varying the modulus value according to a mapping function, as will be further described below.

Figure 11:
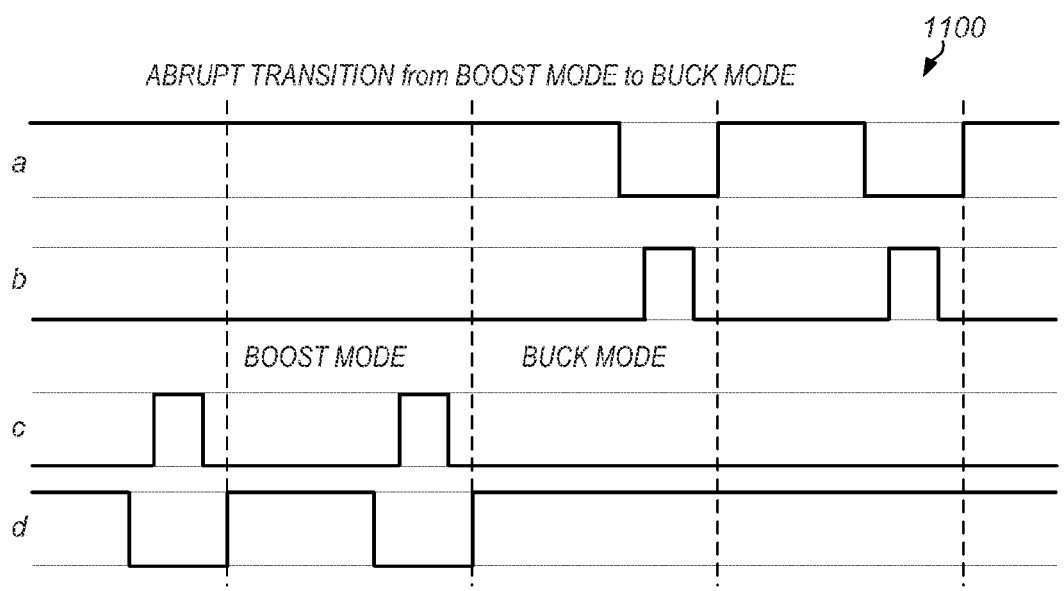
FIG. 11 shows the timing diagram of one example of abrupt transition pulse-timing of control signals controlling a power converter.
Figure 12:
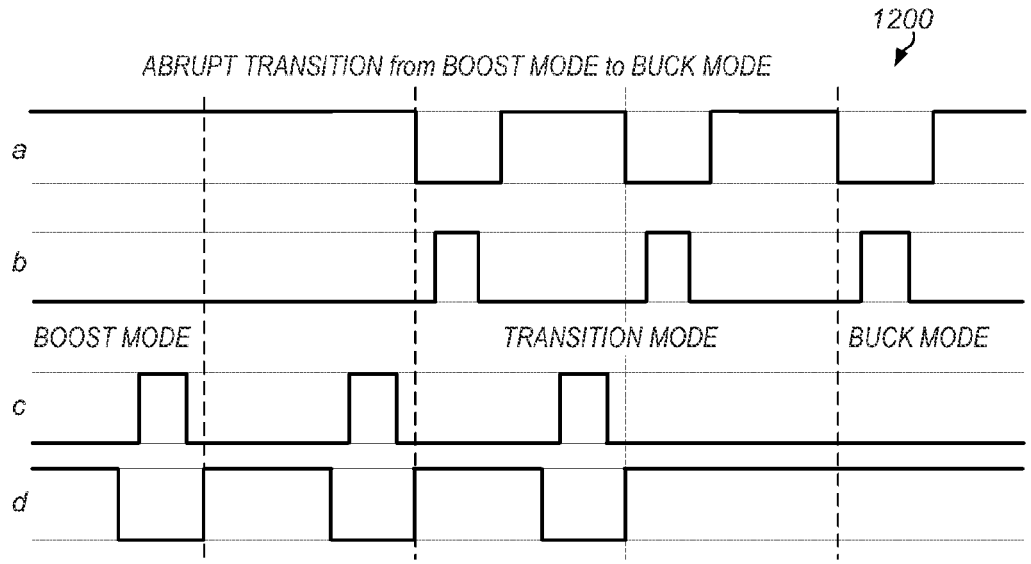
FIG. 12 shows the timing diagram of one example of tri-mode transition pulse-timing of control signals controlling a power converter.

FIG. 11 shows the timing diagram of one example of abrupt transition pulse-timing of control signals controlling a power core. As explained above, input signals a, b, c, and d may represent the respective control signals provided to the respective gates of transistors 804-812 in a power core such as power core 800 shown in FIG. 8. Similarly, FIG. 12 shows the timing diagram of one example of tri-mode transition pulse-timing of the control signals controlling a power core.

Figure 13:
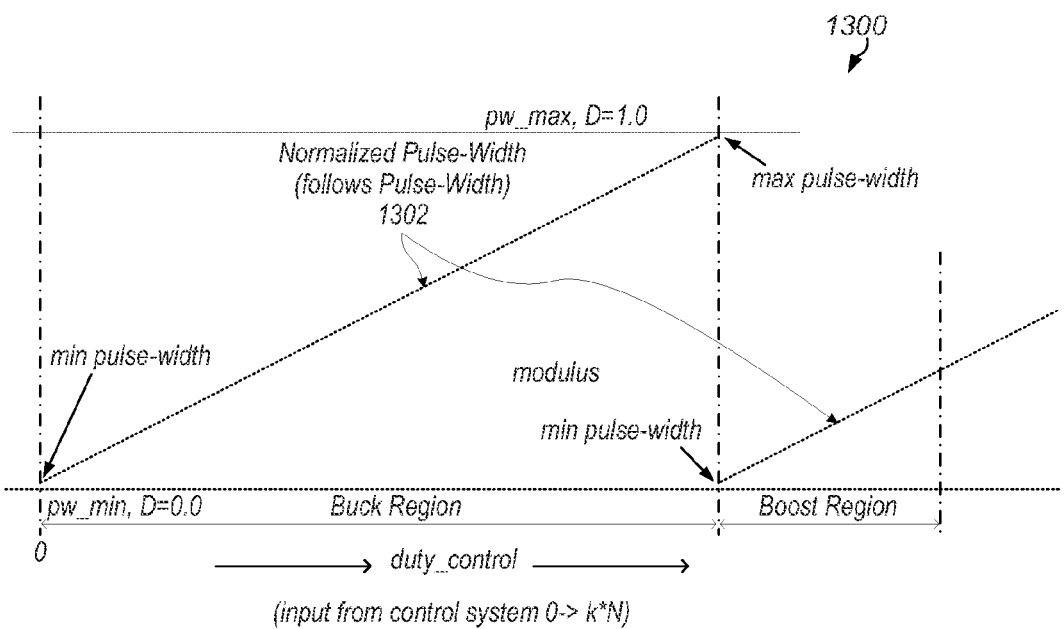
FIG. 13 shows a diagram illustrating one example of pulse-width and modulus curves vs. control system input duty-cycle value.

FIG. 13 shows a diagram 1300 illustrating one example of the pulse-width curve and the modulus curve plotted vs. the duty-cycle value input by the control system, when the divider modulus input value is also constant (the effect of a constant modulus value was also discussed with respect to FIG. 10 above). As seen in diagram 1300, the normalized pulse-width (1302)—that is, the ratio of the pulse-width to one entire period of the PWM waveform—follows the pulse-width as the modulus value is held constant.

Figure 14:
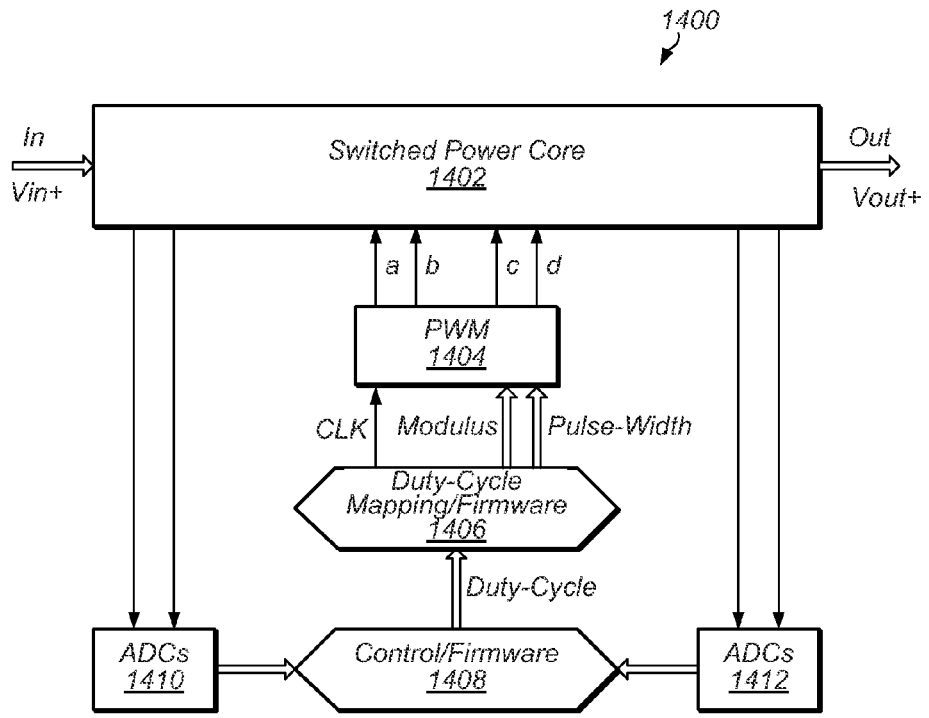
FIG. 14 the partial block diagram of one embodiment of a power converter featuring switching control with dynamic frequency and PWM.

FIG. 14 shows the partial block diagram of one embodiment of a power converter 1400 featuring switching control with dynamic frequency and PWM. In converter 1400, the switched power core 1402 is controlled by a PWM signal generated by signal generator 1404. Controller 1408 may provide a duty-cycle value based on the monitored values of the switched power core input and output voltage and current (which may be digitized via ADC blocks 1410 and 1412, respectively, and provided as input parameters to controller 1408) to a mapping block 1406 configured to map the duty-cycle to a pulse-width value and a modulus value. Mapping block 1406 may provide the pulse-width value and modulus value to PWM generator 1404, which may then generate the PWM signals according to the received modulus and pulse-width values (e.g. as shown in FIG. 10), and provide four PWM signals to the switched power core 1402, each of the four PWM signals controlling a respective corresponding one of the four transistors (shown in FIG. 8, for example).

Figure 15:
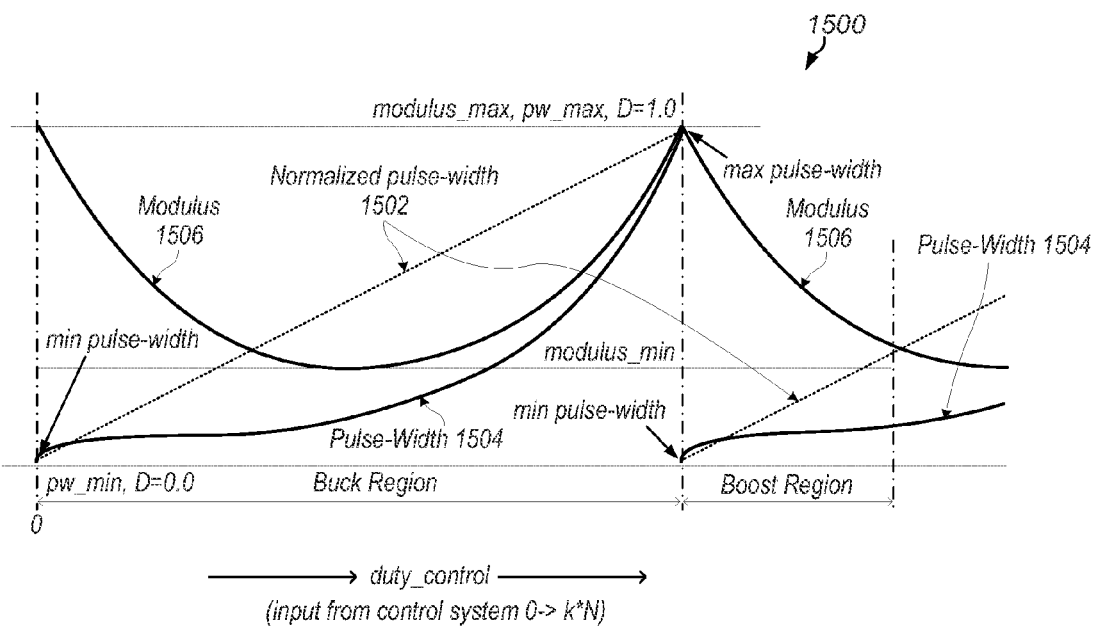
FIG. 15 shows a diagram illustrating one example of warped pulse-width and modulus curves vs. control system input duty-cycle value associated with operation of the power converter of FIG. 14.

FIG. 15 shows a diagram illustrating one example of warped pulse-width and modulus curves vs. control system input duty-cycle value associated with operation of the power converter of FIG. 14. As clearly indicated, the modulus value (1506) is no longer constant, but varies according to a specified mapping function, and example of which is further described below. Accordingly, the normalized pulse-width of the PWM waveform(s) (1502) no longer follows the pulse-width (1504), in contrast to what is shown in diagram 1300.

Discontinuity Boundary Warping Function

One example of a warping function that may be implemented by mapping block 1406 is shown below. It should also be noted that the mapping in block 1406 may be implemented as firmware (i.e. software), hardware, or a combination of both, as desired.

$$\text{discontinuous mode boundary} \approx D^*(1-D)/2^*I_o \quad \{\text{Buck Mode}\}$$

where $I_o$ is the output current for the converter, and D is the normalized pulse-width (as mentioned above, the ratio of the pulse-width to the period of the PWM waveform). The Boost mode discontinuous boundary may follow a similar curve shape through the first half of its region.

$$\text{warp\_function}=1-4^*(D_{in})^*(1-D)/N^2$$

$$\text{modulus}=K_{min}+(K_{max}-K_{min})^*\text{warp\_function}$$

$$\text{pulse-width}=D_{in}^*(\text{modulus}-2^*pw\_min)/N$$

where, N is the input duty-cycle value "range", $D_{in}$ is the input duty-cycle value from the control block 1408 (having a range from 0 to N, in the Buck region example), modulus is the divider modulus for setting the switching frequency, where $F_{switching}$=Clock/modulus, the pulse-width is the value sent to the PWM signal generating block 1404 to control the duty cycle, and $K_{min}$ & $K_{max}$ are the minimum and maximum values for the modulus, respectively.

The warping function equations shown above are exemplary equations of a warping function that may be optimal for buck-mode over the entire range from D=0 to D=1.0, and for boost-mode from a D-value up to 0.5, or a boost-ratio equivalent to 2×. However, the above equations may not be most optimal for all applications, and several other variations of the warping function yielding slightly different equations are possible and are contemplated, all falling within the scope of using a warping function combined with a dynamically variable pulse-width and modulus (where $F_s$=1/modulus) derived from the given function to perform control as illustrated in at least FIG. 14.

FIG. 16 shows an example C/C++ routine that implements the mathematical warping function on a 16-bit fixed point embedded controller. The example code shown in FIG. 16 illustrates an implementation of the warping function, and resultant modulus and duty-cycle value calculations within a fixed-point microcontroller embedded in a C/C++ environment. In the example code of FIG. 16, the value N_K is the fixed point reciprocal multiplier, which is derived from $2^{12}$/N, by multiplying by N_K, then right shifting 12-bits to implement a divide-by-N operation. The example code in FIG. 16 also includes examples of the staged multiply and shift sequences that may be required for a low cost, high-speed, fixed-point implementation.

Numerous variations and modifications will become apparent to those skilled in the art once the above disclosure is fully appreciated. Note the section headings used herein are for organizational purposes only, and are not meant to limit the descriptions provided herein. Numerical values throughout have been provided as examples, and are not meant to limit the descriptions provided herein.

I claim:

1. A control system comprising:
    an input configured to receive a duty-cycle value;
    a conversion block configured to generate a modulus value and a pulse-width value (PWV) based on the received input duty-cycle value; and
    a pulse-generator configured to:
        generate a pulse-width modulated (PWM) signal; and
        simultaneously modulate:

a frequency of the PWM signal according to the generated modulus value; and
a pulse-width of the PWM signal according to the generated PWV; and
an output configured to provide the PWM signal to a switching power converter to control the switching power converter.

2. The control system of claim 1, wherein the conversion block is configured to:
implement a warp function that maps the modulus value to the input duty-cycle value; and
implement a second function that maps the PWV to the modulus value and to the input duty-cycle value to maintain a desired linear ratio between the PWV and a pulse-period of the PWM signal.

3. The control system of claim 1, wherein the conversion block is programmable with a mapping algorithm to map the modulus value to the input duty-cycle value, and further to map the PWV to the modulus value and to the input duty-cycle value;
wherein the conversion block is configured to generate the modulus value and the PWV according to the mapping algorithm.

4. The control system of claim 1, wherein the pulse generator comprises a digital timer having both modulus and pulse-width programming capability, and configured to generate the PWM signal.

5. A power converter comprising:
a signal generating circuit configured to:
receive an input duty-cycle value and generate a modulus value and a pulse-width value (PWV) based on the received input duty-cycle value; and
generate a pulse-width modulated (PWM) signal, wherein in generating the PWM signal, the signal generating circuit is configured to:
simultaneously modulate:
a frequency of the PWM signal according to the generated modulus value; and
a pulse-width of the PWM signal according to the generated PWV; and
a control system configured to:
monitor parameters of the power converter, wherein the parameters comprise one or more of:
input voltage of the power converter;
input current of the power converter;
output voltage of the power converter; or
output current of the power converter; and
generate and supply the input duty-cycle value to the signal generating circuit based on the monitored parameters of the power converter.

6. The power converter of claim 5, wherein the signal generating circuit is programmable with a mapping algorithm to:
map the modulus value to the input duty-cycle value; and
map the PWV to the modulus value and to the input duty-cycle value to maintain a specified relationship between the PWV and an instantaneous frequency of the PWM signal.

7. The power converter of claim 5, wherein the signal generating circuit comprises:
a divider circuit configured to receive a first clock signal and the modulus value, and generate a divider modulus control signal based on the first clock signal and the modulus value; and
a pulse generator digital timer configured to generate the PWM signal according to the divider modulus control signal and the PWV.

8. The power converter of claim 5, further comprising a switching power core configured to receive the PWM signal, and generate the output voltage of the power converter according to the PWM signal.

9. The power converter of claim 8, wherein the control system comprises:
first analog to digital converters (ADCs) configured to generate first numeric values representative of the input voltage of the power converter and the input current of the power converter;
second ADCs configured to generate second numeric values representative of the output voltage of the power converter and the output current of the power converter; and
a controller configured to calculate the input duty-cycle value from at least the first and second numeric values.

10. The power converter of claim 9, wherein the controller is programmable with a control algorithm to calculate the input duty-cycle from at least the first and second numeric values and one or more additional input parameters.

11. A method for controlling a switching power converter, the method comprising:
generating a modulus value and a pulse-width value (PWV) from a duty-cycle value (DCV);
generating a pulse-width modulated (PWM) signal, said generating the PWM signal comprising:
simultaneously modulating an instantaneous frequency and a pulse-width of the PWM signal, said simultaneously modulating comprising:
setting a pulse-period corresponding to the instantaneous frequency of the PWM signal according to the modulus value; and
setting the pulse-width of the PWM signal according to the PWV; and
supplying the PWM signal to a switching power core to control a switching of the switching power converter.

12. The method of claim 11, wherein said generating the modulus value comprises mapping the modulus value to the DCV according to a specified mapping function.

13. The method of claim 11, wherein said generating the PWV comprises mapping the PWV to the modulus value and to the DCV.

14. The method of claim 11, wherein said generating the modulus value and the PWV comprises maintaining a specified functional relationship between the PWV and the pulse-period.

15. The method of claim 14, wherein the specified functional relationship is a specified linear relationship.

16. The method of claim 11, further comprising the switching power core generating an output voltage according to the PWM signal and an input voltage value.

17. The method of claim 11, further comprising generating the DCV according to one or more of:
an input voltage of the power converter;
an input current of the power converter;
an output voltage of the power converter; or
an output current of the power converter.

18. A method for using dynamic pulse-width and frequency modulation to control switching of a switching power converter, the method comprising:
determining a duty-cycle value (DCV) for a pulse-width modulated (PWM) signal;
translating the DCV to a first parameter and a second parameter;
simultaneously modulating a pulse-width (PW) and a pulse-period (PP) of the PWM signal, comprising:
modulating the PP according to the first parameter; and modulating the PW according to the second parameter; and maintaining a specified functional relationship between the PW and the PP of the PWM signal.

19. The method of claim 18, wherein said maintaining the specified functional relationship between the PW and the PP of the PWM signal comprises maintaining a linear relationship between the PW and the PP of the PWM signal.

20. The method of claim 18, wherein said translating comprises:
   mapping the first parameter to the DCV according to a function determining a value of the first parameter based on the DCV and one or more of:
      a specified DCV range;
      a specified minimum value for the first parameter; or
      a specified maximum value for the first parameter.

21. The method of claim 18, wherein said translating comprises:
   mapping the second parameter to the first parameter and to the DCV according to a function determining a value of the second parameter based on the DCV and the first parameter and one or more of:
      a minimum value for the PWV; or
      a specified DCV range.

22. The method of claim 18, wherein said determining the DCV comprises:
   monitoring parameters comprising one or more of:
      an input voltage of the switching power converter;
      an input current of the switching power converter;
      an output voltage of the switching power converter; or
      an output current of the switching power converter; and
   calculating the DCV according to the monitored parameters.

* * * * *